United States Patent
Friedman

[11] 3,791,383
[45] Feb. 12, 1974

[54] ANIMAL SHIELD
[76] Inventor: Sanford J. Friedman, 15260 Kenton, Oak Park, Mich. 48237
[22] Filed: Dec. 23, 1971
[21] Appl. No.: 211,529

[52] U.S. Cl.................... 128/154, 128/133, 119/96
[51] Int. Cl. ............................................ A61f 13/00
[58] Field of Search.......... 128/154, 132 R, 133, 83, 128/87 R, 165; 119/1, 96; 54/82

[56] References Cited
UNITED STATES PATENTS
| | | | |
|---|---|---|---|
| 809,276 | 1/1906 | Aulton | 128/87 R |
| 686,338 | 12/1901 | Ready | 128/133 |
| 715,059 | 12/1902 | Haglock | 128/165 |
| 1,488,978 | 4/1924 | Faris | 128/133 |
| 739,634 | 9/1903 | Allen | 128/87 R |

Primary Examiner—Lawrence W. Trapp
Attorney, Agent, or Firm—Arnold S. Weintraub

[57] ABSTRACT

A shield for enveloping a leg-sustained injury on four-legged animals includes a tubular member having cut-out sections and harnessing means such that the movement of the animal is unimpaired.

6 Claims, 6 Drawing Figures

ANIMAL SHIELD

BACKGROUND OF THE INVENTION

1. Field of the Invention

The present invention concerns injury protection devices and in particular injury protection devices for four-legged animals. Even more particularly, the present invention concerns an injury protection device for four-legged animals which enables unimpaired movement of the injured limb.

2. Prior Art

Domestic animals, such as, cats and dogs, as well as other four-legged animals, such as, horses, bovine animals, and the like have a tendency to sustain leg injuries, such as, cuts, abrasions, lacerations, burns and the like. Veterinary treatment greatly aids and abets cure for the sustained injury.

However, during the post-treatment the animal has a tendency to gnaw, chew or otherwise get at the injury location which may have stitches, topical dressings or other medicinal treatment applied thereat during healing. This action by the animal tends to inhibit and prolong the recuperative period and may lead to infection of the injured site. Thus, the present invention seeks to provide an injury protection device which will effectively prevent the animal from reaching the injury wound and as an advantageous concomitant thereof does not deter or otherwise impair movement of the injured limb.

SUMMARY OF THE INVENTION

In accordance with the present invention an injury protection device for quadropods or four-legged animals comprises a tubular member having transversely opposed cut-out sections. The cut-out sections are adapted to enable the leg joints to have complete mobility such that the movement of the animal is unimpaired. The device further includes harnessing means for securely attaching the device to the animal.

Means for venting the injury to the atmosphere to facilitate in healing of the injury are also included with the device.

For a more complete understanding of the present invention, reference is made to the following detailed description and accompanying drawing. In the drawing like reference characters refer to like parts throughout the views in which:

DESCRIPTION OF THE PREFERRED EMBODIMENT

Figures 1, 2, 3, 4:
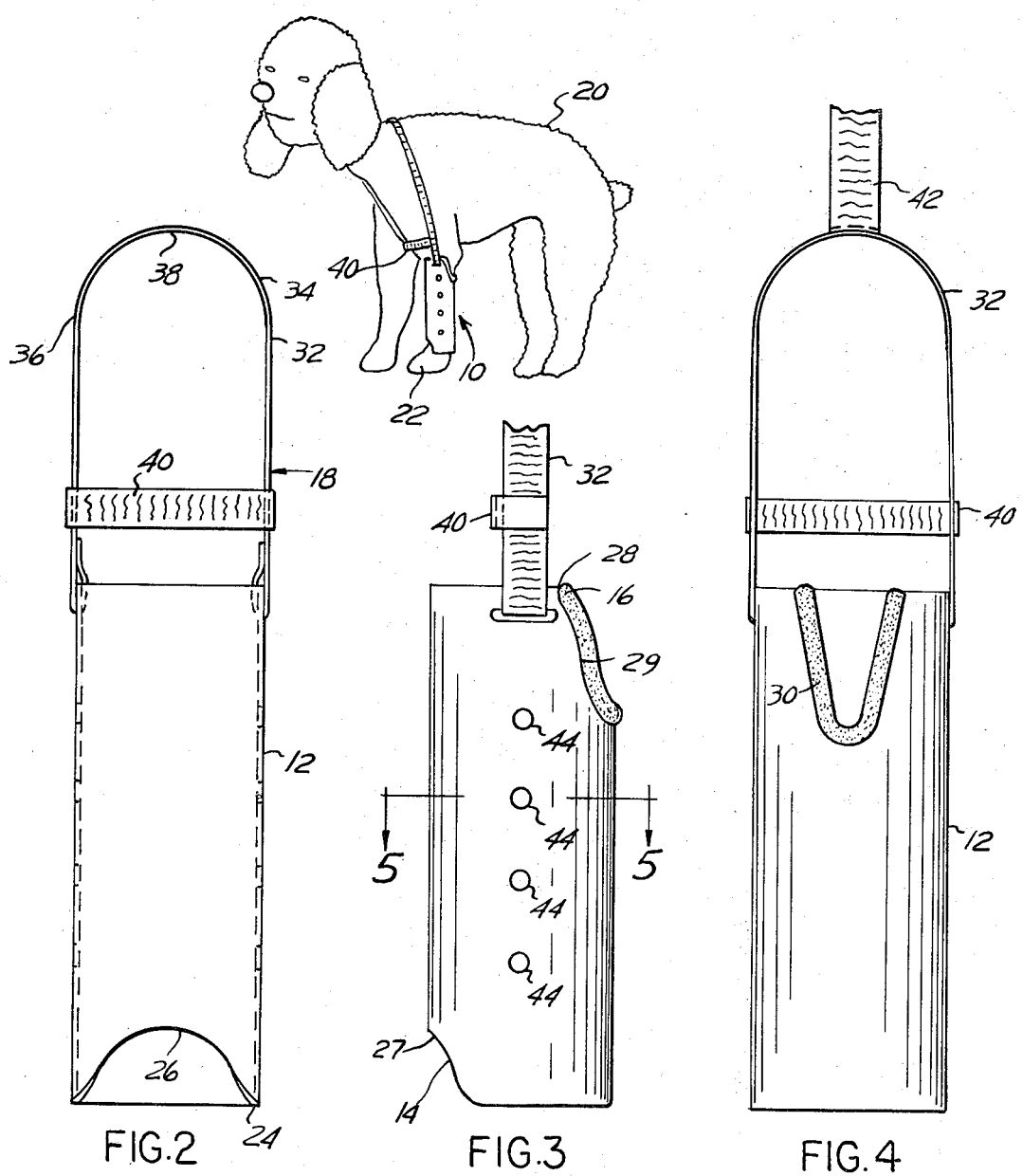
FIG. 1 is a pictorial representation of the device of the present invention in use.
FIG. 2 is a cross-sectional view of the device of the present invention along its vertical axis.
FIG. 3 is a side elevation view of the device of the present invention.
FIG. 4 is another side elevation of the device showing the harnessing means.
Figure 5:
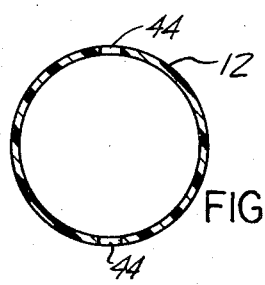
FIG. 5 is a cross-sectional view taken along the line 5—5 of FIG. 3.

Referring to the drawing, and in particular to FIGS. 1-5, it is seen that the present device 10 generally includes a tubular 12 having opposed cut-out sections 14, 16 and means 18 for harnessing the device 10 to a four-legged animal 20.

The tubular member 12 is adapted to envelop the injured portion of the limb without being restrictive. Thus, the tubular member 12 has a diameter greater than that of the animal leg 22. The tubular member 12 is preferentially constructed of any wellknown light weight material such as a polyurethane, polyvinylic compound, or similar material of sufficient durability to prevent the animal from gnawing or chewing therethrough to get at the injury.

The member 12 has one end 24 thereof provided with a first arcuate cut-out section 26 defining an arcuate edge 27. The cut-out section 26 is provided in the tubular member 12 to enable the joint of the leg 22 of the animal to be completely mobile so that the mobility of the animal is unimpaired.

The opposite or second end 28 of the tubular member 12 has a cut-out section 16 similar to that of cut-out section 14, also, being arcuate in form and defining an edge 29. The cut-out section 16 is opposed to cut-out section 14 along the transverse diagonal of the tubular member 12.

As shown in FIG. 4, optionally, a cushion 30 is provided along the edge 29 of the cut-out section 16. The cushion 30 can comprise a cushioning foam material, or other similar material and enables the area of the animal around the joint to rub against the edge 29 of the cut-out section 16 without inducing any injury to the leg. The cushion 30 is bonded to or otherwise secured to the area of the member 12 proximate the edge of the cut-section 16.

A cushion (not shown) similar to that of cushion 30 may, also, be provided along the edge of cut-out section 14.

It is to be appreciated that by the present invention complete protection of the leg injury and complete mobility of the leg are herein achieved.

Referring to FIG. 2 in order to secure the device 10 to the animal a harnessing means 18 is included with the device 10. The harness means includes a torso band 32 which snuggly engages the torso or trunk of the animal. The torso band, preferably, comprises two sections 34 and 36 with fastening means, such as, snaps 38 for separably connecting the two sections together. However, it is to be understood that the torso band can comprise a single elongate band which by its elasticity snuggly engages the torso, such as is shown in FIG. 4.

The torso band is fixed to the tubular member in any convenient manner such as by rivets, studs or the like.

The harnessing means 18, preferably, further includes a transverse band 40 both ends of which are connected to the torso band substantially as shown in FIG. 2 such as by stitching, riveting, or the like. The transverse band engages the leg of the animal and provides stability to the torso band, as shown in FIG. 1.

Referring to FIG. 4, an elongate band 42 has one end thereof connected or otherwise attached to the torso band 32 approximately medially thereof.

An attachment clip or other attachment means (not shown) is mounted or otherwise secured to the other end of the elongate band. The attachment means is connectable to a collar, chain or other device attached about the neck of the animal.

The provision of the elongate band 42 enables deployment of the shield about a hind leg of the animal.

As shown in FIG. 3 in order to enable the injury to heal by exposure to the atmosphere, the tubular member 12 is provided with a plurality of vents 44 to allow the passage of air therethrough.

Figure 6:
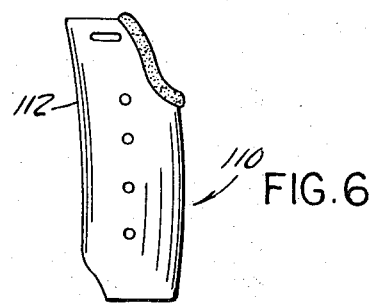
FIG. 6 is a side-elevational view of an alternate embodiment of the invention.

Referring now to FIG. 6, there is depicted therein an alternate preferred embodiment of the present invention. According to this embodiment, the device 110 includes a tubular member 112 arcuate in form.

The arcuate configuration accorded the tubular member 112 is sufficient to accommodate free movement of the mid-joint of the leg while providing means for protecting an injury located proximate the mid-joint of the leg.

It will, also, be apparent from the preceding that the present invention provides a device whereby the limbs of a four-legged animal can be protected from sustaining an injury when in an environment conducive to imparting an injury thereto, without impairing the movement of the limbs.

Having thus described the invention, what is claimed is:

1. An injury protection device for a four-legged animal comprising:
    a. a tubular member having transversely opposed arcuate cut-out sections, the tubular member having a diameter substantially greater than the leg of the animal to envelop the injured portion of the leg, and
    b. harnessing means for securing the device to the animal.

2. The device of claim 1 wherein cushioning means are disposed along the edges of the cut-out sections.

3. An injury protection device for a four-legged animal comprising:
    a. a tubular member having transversely opposed arcuate cut-out sections, and
    b. harnessing means for securing the device to the animal, the harnessing means comprising:
        1. a torso band connected to one end of the tubular member, and
        2. a transverse band adapted to engage the leg of the animal and having both ends thereof connected to the torso band.

4. The device of claim 3 wherein the harnessing means includes an elongate band having one end connected to the torso band and attachment means provided at the other end of the elongate band.

5. The device of claim 3 wherein the torso band comprises a first and second section and means for separably connecting the two sections together.

6. The device of claim 3 wherein the tubular member is an arcuate tubular member.

* * * * *